United States Patent [19]

Akiyama

[11] Patent Number: 5,684,806
[45] Date of Patent: Nov. 4, 1997

[54] COMMUNICATION APPARATUS FOR TDMA SYSTEM

[75] Inventor: Keiji Akiyama, Tokyo, Japan

[73] Assignee: Sony Corporation, Tokyo, Japan

[21] Appl. No.: 492,499

[22] Filed: Jun. 20, 1995

[30] Foreign Application Priority Data

Jun. 29, 1994 [JP] Japan ................................. 6-148105

[51] Int. Cl.$^6$ ................................................. H04J 3/12
[52] U.S. Cl. .......................... 370/522; 370/523; 370/528
[58] Field of Search ................................. 370/111, 110.1, 370/110.4, 118, 13, 17, 112, 68.1, 95.1, 95.3, 465, 498, 522, 523, 524, 525, 526, 527, 528, 529

[56] References Cited

U.S. PATENT DOCUMENTS

| | | | |
|---|---|---|---|
| 4,245,340 | 1/1981 | Landry | 370/111 |
| 4,330,858 | 5/1982 | Choquet | 370/111 |
| 4,729,022 | 3/1988 | Shibuya et al. | 370/111 |
| 4,730,312 | 3/1988 | Johnson et al. | 370/110.1 |
| 5,440,542 | 8/1995 | Procter et al. | 370/111 |
| 5,507,006 | 4/1996 | Knight | 370/111 |

FOREIGN PATENT DOCUMENTS

| | | |
|---|---|---|
| 3130176 | 2/1983 | Germany. |
| 2217955 | 1/1989 | United Kingdom. |

*Primary Examiner*—Wellington Chin
*Assistant Examiner*—Huy D. Vu
*Attorney, Agent, or Firm*—Jay H. Maioli

[57] ABSTRACT

A communication system includes a master station connected to a telephone line network and a plurality of remote stations for transmitting and receiving digital data to and from the master station through a radio transmission line. Among the master station and the remote stations, one channel is divided into a plurality of slots. One of the plurality of slots is assigned as a control slot to transmit and receive data in a time-division manner. The master station transmits control data to the remote stations by the control slot. The master station transmits control data by the control slot at every predetermined period and also transmits data concerning a communication by the control slot during a predetermined period.

11 Claims, 6 Drawing Sheets

FIGURE 1A  Slot Arrangement of Master Station
FIGURE 1B  Transmission and Reception Timings of Remote Station a
FIGURE 1C  Transmission and Reception Timings of Remote Station b
FIGURE 1D  Transmission and Reception Timings of Remote Station c (PRIOR ART)

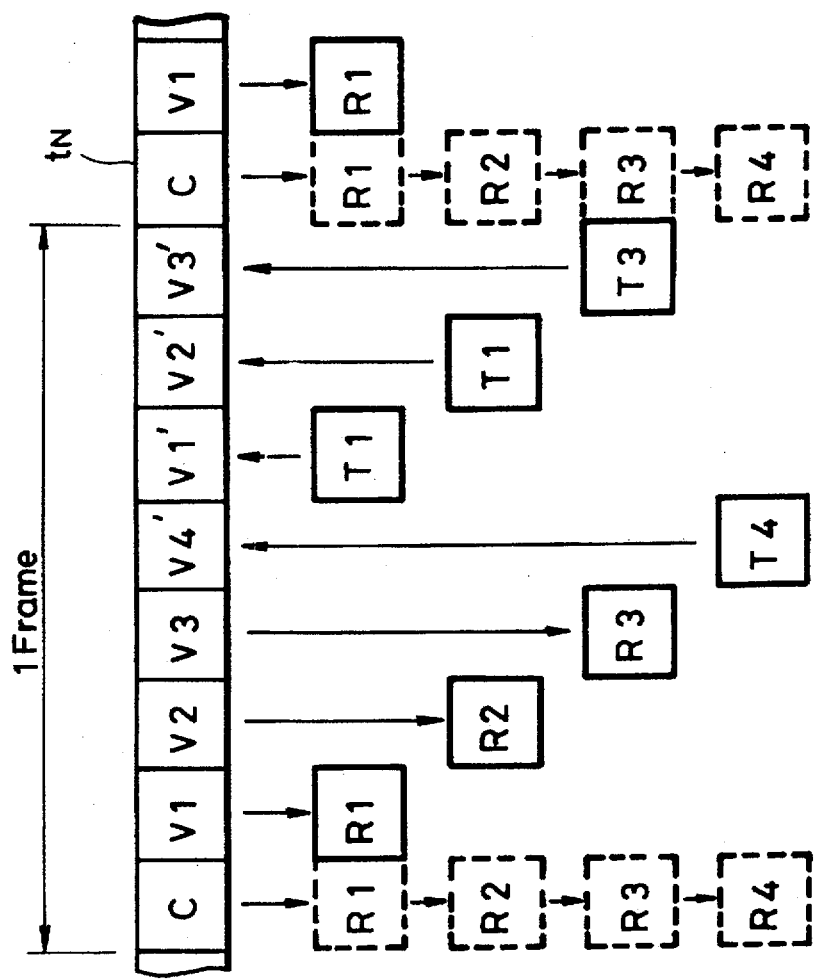
FIGURE 5A Slot Arrangement of Master Station
FIGURE 5B Transmission and Reception Timings of Remote Station M1
FIGURE 5C Transmission and Reception Timings of Remote Station M2
FIGURE 5D Transmission and Reception Timings of Remote Station M3
FIGURE 5E Transmission and Reception Timings of Remote Station M4

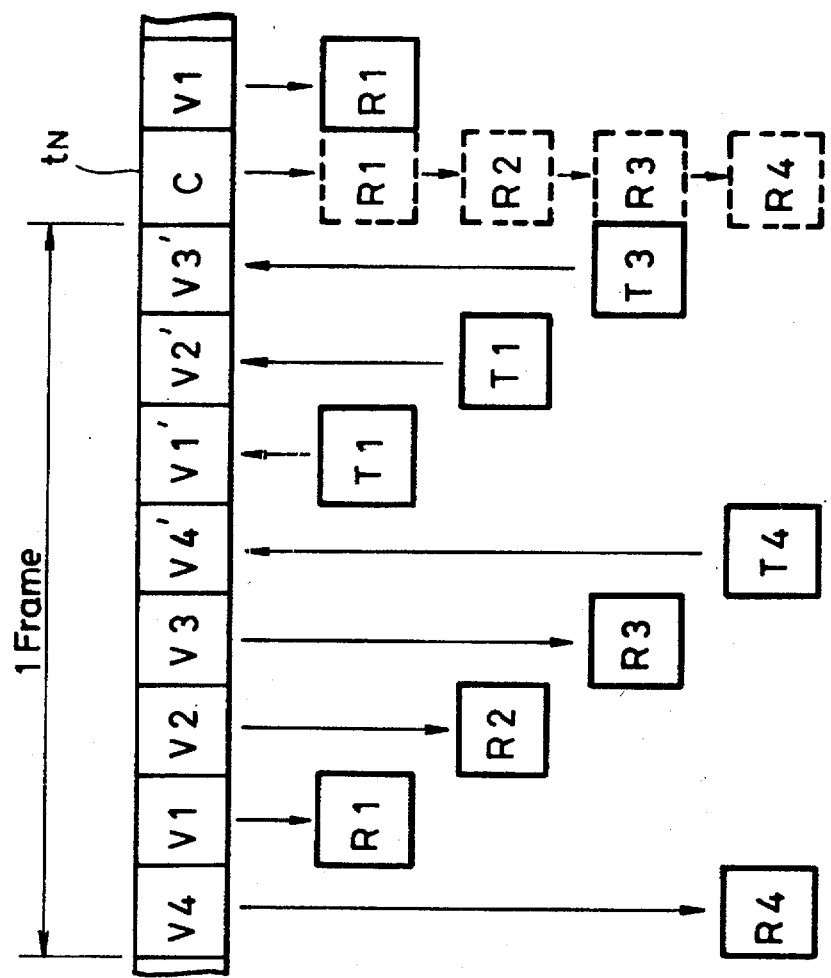
FIGURE 6A  Slot Arrangement of Master Station
FIGURE 6B  Transmission and Reception Timings of Remote Station M1
FIGURE 6C  Transmission and Reception Timings of Remote Station M2
FIGURE 6D  Transmission and Reception Timings of Remote Station M3
FIGURE 6E  Transmission and Reception Timing of Remote Station M4

COMMUNICATION APPARATUS FOR TDMA SYSTEM

BACKGROUND

1. Field of the Invention

The present invention relates to a transmission and reception apparatus and, more particularly, is directed to a transmission and reception apparatus for transmitting and receiving data based on a TDMA system.

2. Background of the Invention

A communication system called a TDMA (time division multiple access) system has heretofore been put into practical use. According to the TDMA system, a communication can be made by a slot arrangement such as shown in FIGS. 1A to 1D. In a radio telephone system based on the TDMA system, for example, a master station serving as a base station and a remote station serving as a terminal device can communicate with each other through a radio transmission line. When the remote station and the master station communicate with each other via the radio transmission line, a telephone communication can be made between the person being called who is connected through the telephone line network to the master station and the remote station. In the case of a communication system based on the TDMA system, a single master station and a plurality of remote stations can communicate with one another by using one channel (single frequency). As shown in FIG. 1A, one frame, which is a unit for making a communication, is divided into a plurality of slots (8 slots) on the master station side. In this case, one frame has a duration of 5 milliseconds and one slot has a duration of 0.625 millisecond. Communication is carried out by repeating the units.

When one frame is composed of 8 slots, up to three remote stations a, b, c can be connected simultaneously to the master station by using one channel. Specifically, the first slot of one frame is assigned to a control slot C during which the master station transmits control data to the remote stations. The control data is used to carry out a control, such as assigning slots for transmitting communication data and individually accessing the remote stations. Accordingly, the control data that is transmitted from the master station during the control slot C is received by the remote station which communicates with the master station, i.e., any one of the remote stations a, b, c shown in FIGS. 1B, 1C and 1D.

As shown in FIGS. 1B, 1C and 1D, the three remote stations a, b, c are simultaneously connected to the master station. Three slots V1, V2, V3 which follow the control slot C are slot periods during which communication data is transmitted from the master station to the three remote stations a, b, c. The communication data are results from converting an audio signal of 5 milliseconds into digital data is compressed so that the digital data of 5 milliseconds can be transmitted during one slot period. The three remote stations a, b, c carry out receptions Ra, Rb, Rc during corresponding slot periods as shown in FIGS. 1B, 1C and 1D.

Then, the next one slot after slot V3 is not used i.e. it is, an empty slot. The master station receives communication data from the three remote stations a, b, c during the last three slots V1', V2', V3'. Accordingly, the three remote stations a, b, c carry out transmissions Ta, Tb, Tc of communication data during corresponding slot periods as shown in FIGS. 1B, 1C and 1D. Also in this case, communication data are results from converting an audio signal of 5 milliseconds into digital data that is compressed so that the digital data of 5 milliseconds can be transmitted during one slot period.

According to the circumstances, control data is received during the empty slot provided between the transmission slot V3 and the reception slot V1' of the master station. The transmission of control data in the slot assigned to the control slot C is not carried out for every frame. But, it is customary that such transmission is carried out only once during a period ranging from several frames to several tens of frames.

If one channel is divided into slots as described above, then communication data is transmitted and received among one master station and the three remote stations by using one channel (i.e., single transmission frequency). Therefore, it is possible for the master station to simultaneously communicate with many terminal devices with fewer channels.

Even though the master station can be connected to a plurality of remote stations by using one channel in a multiple access fashion, the number of remote stations that can be connected to the master station in a multiple access fashion is unavoidably limited. In the example shown in FIGS. 1A through 1D, only three remote stations can be connected to the master station through one channel at maximum. On the other hand, there is a demand for improving the efficiency of using a transmission channel by increasing the number of remote stations connected to the master station through one channel.

In order to increase the number of remote stations that can be connected to the master station via one channel, it has been proposed that the number of slots provided in one frame be increased. In this case, however, if the number of slots is increased, then either the duration of the frame period is extended or the duration of the slot period is reduced. For the latter option, however, it is frequently observed that audio data cannot be compressed satisfactorily.

SUMMARY OF THE INVENTION

It is therefore an object of the present invention to provide a transmission and reception apparatus in which the above-mentioned problem can be solved.

It is another object of the present invention to provide a communication system in which the above-mentioned problem can be solved.

According to the present invention, there is provided a transmission and reception apparatus. The transmission and reception apparatus divides one channel into a plurality of slots. One of the plurality of slots is assigned as a control slot in which control data is processed in a time division multiplex fashion and transmitted and received together with data concerning a communication. The transmission and reception apparatus includes a transmission and reception unit and a control unit. The transmission and reception unit processes data in a time-division multiplex fashion and transmits the data thus processed. Also, the transmission and reception unit receives transmitted data. The control unit controls an operation of the transmission and reception unit. The control unit transmits data concerning a communication by the control slot at a time to transmit control data during a predetermined period provided after the control data has been transmitted by the control slot.

According to the present invention, there is provided a communication system which includes a master station connected to a telephone line network and a plurality of remote stations which transmit and receive digital data to and from the master station via a radio transmission line. Among the master station and the remote stations, one channel is divided into a plurality of slots and one of the plurality of slots is assigned as a control slot during which digital data is transmitted and received in a time division manner. Also, control data is transmitted from the master station to the remote stations by the control slot. The master-station transmits control data by the control slot at every predetermined period also transmits data concerning a communication by the control slot during a predetermined period.

According to the present invention, data concerning a communication is transmitted by using the control slot when control data is not transmitted by the control slot. Thus, it is possible to increase the number of remote stations that can be connected to the master station by using one channel.

BRIEF DESCRIPTION OF THE DRAWINGS

FIGS. 5A through 5E are timing charts showing an arrangement of slots provided when it is detected that communication data transmitted by a slot V4 is placed in the mute state according to the embodiment of the present invention; and FIGS. 6A through 6E are timing charts showing an arrangement of slots provided when it is detected that communication data transmitted by the slot V4 is not placed in the mute state according to the embodiment of the present invention.

DESCRIPTION OF THE INVENTION

A transmission and reception apparatus according to an embodiment of the present invention will hereinafter be described in detail with reference to the drawings.

Figure 1:
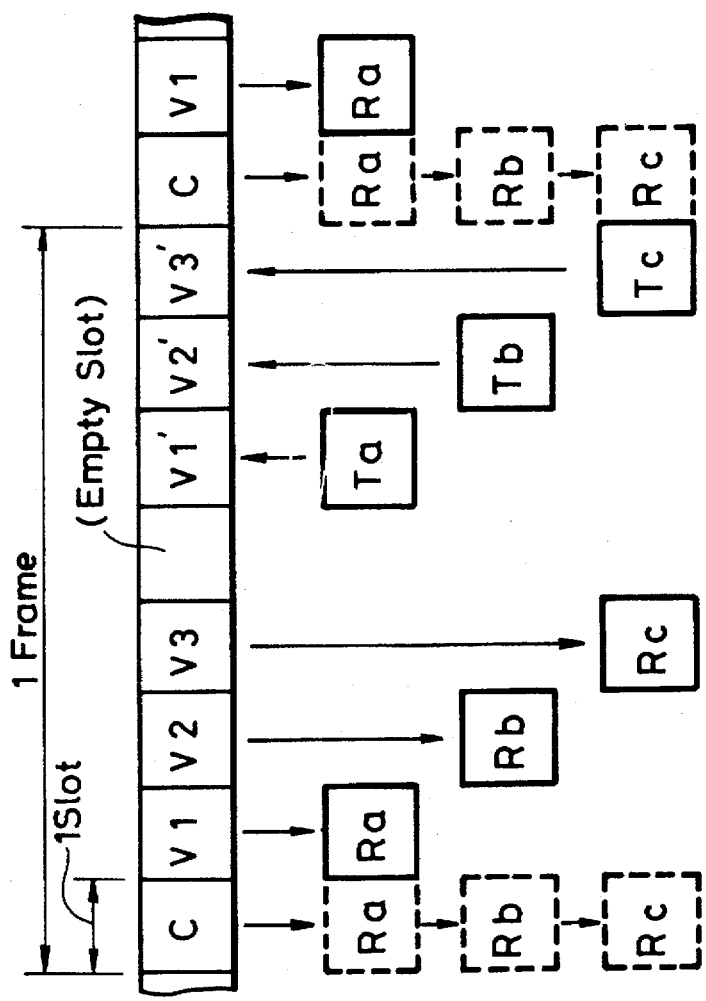
FIGS. 1A through 1D are timing charts showing an example of an arrangement of slots based on the TDMA system.
Figure 2:
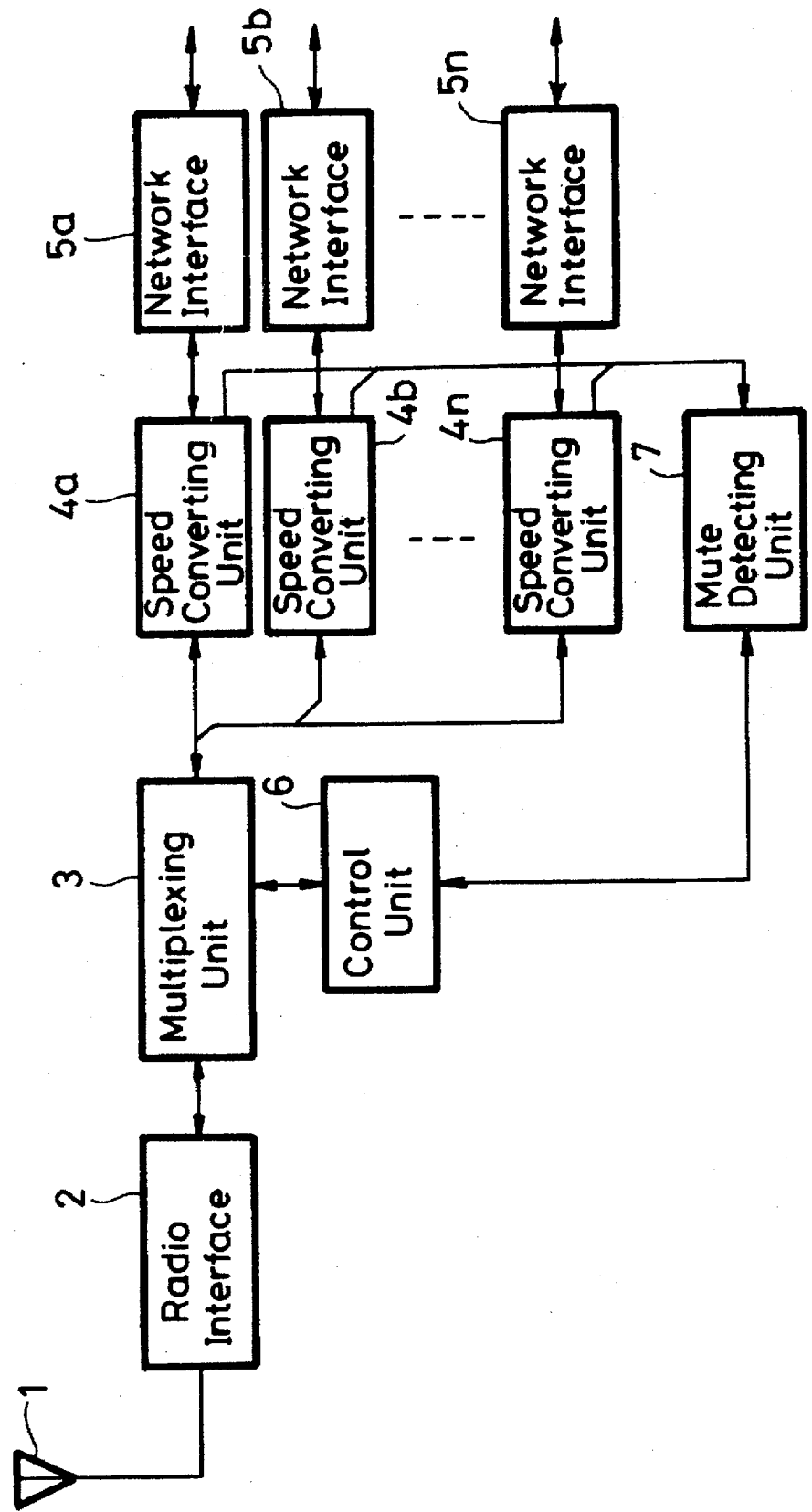
FIG. 2 is a block diagram showing an arrangement of a master station according to an embodiment of the present invention.

In this embodiment, the transmission and reception apparatus according to the present invention is applied to a radiotelephone system in which a signal, which was converted to digital data, is transmitted and received among a master station serving as a base station and terminal stations serving as remote stations in a TDMA system fashion. FIG. 2 shows in block form an arrangement of an inventive master station.

As shown in FIG. 2, an antenna 1 is connected to a radio interface 2. The radio interface 2 demodulates a received signal received at the antenna 1 or modulates the received signal so that the signal can be transmitted or received satisfactorily. This radio interface 2 is connected to a multiplexing unit 3. The multiplexing unit 3 separates data inserted into respective slots of the received signal and synthesizes data so that data is inserted into the respective slots of a transmitted signal. An arrangement of the slots will be described later on.

A plurality of speed converting units 4a, 4b, . . . , 4n are connected to the multiplexing unit 3. In this embodiment, the number of the speed converting units 4a through 4n that can be connected to the multiplexing unit 3 is selected to be 4 so that there are prepared 4 line networks. Each of the speed converting units 4a through 4n carries out a speed conversion processing to convert intermittent received data extracted from respective slots to consecutive data. Moreover, each of the speed converting units 4a through 4n carries out a speed conversion processing to convert transmission data to intermittent data so that the transmission data can be inserted into the respective slots. Network interfaces 5a, 5b, . . . , 5n are connected to the speed converting units 4a through 4n, respectively. Each of the network interfaces 5a, 5b, . . . , 5n is connected to a digital telephone line network, such as an ISDN (integrated service digital network) line network. The network interfaces 5a through 5n convert a clock rate in order to convert data output thereto from the speed converting units 4a through 4n to data transmitted to the telephone line network. Moreover, the network interfaces 5a through 5n convert the clock rate in order to convert data received from the telephone line network to radio transmission data by the radio interface 2.

The processing in each circuit provided within the master station shown in FIG. 2 is executed at a synchronized timing under the control of a control unit 6.

Data supplied to the speed converting units 4a through 4n are also supplied to a mute detecting unit 7. The mute detecting unit 7 determines whether or not communication data transmitted from the telephone line network side to the network interfaces 5a to 5n at every network are placed in the mute state. As a method used by the mute detecting unit 7 to determine whether or not communication data is placed in the mute state, there are enumerated a method of detecting a mute state code added when a transmitted audio signal is placed in the mute state and a method of detecting based on the state of transmitted audio data whether or not communication data is placed in the mute state. In this case, when the four speed converting units 4a through 4n are all in use, or four networks are connected to the master station, the mute detecting unit 7 detects the mute state of the network connected last. When the mute detecting unit 7 detects the mute state, a detected result of the mute detecting unit 7 is supplied to the control unit 6.

The control unit 6 supplies the control data to the multiplexing unit 3 at a predetermined time to enable the control data to be transmitted to the remote station side by a predetermined slot. Also, control data of up-link which is transmitted from the remote station by a predetermined slot and which is supplied to the multiplexing unit 3 is supplied to the control unit 6.

The control unit 6 carries out a communication control processing such that up to four remote stations, i.e., four line networks can communicate with one another simultaneously by one channel through radio waves. When the four line networks are simultaneously in use, if it is determined by the mute detecting unit 7 that communication data transmitted from the telephone line network side to the speed converting unit 4n of one line network is placed in the mute state, then the control unit 6 supplies control data, which is to be transmitted to the remote station, to the multiplexing unit 3. However, when a transmission of control data is stopped during a predetermined period, even if it is determined by the mute detecting unit 7 that communication data is not placed in the mute state, then the control unit 6 supplies the control data to the multiplexing unit 3 to transmit the same by a predetermined slot. This processing will be described later on.

Figure 3:
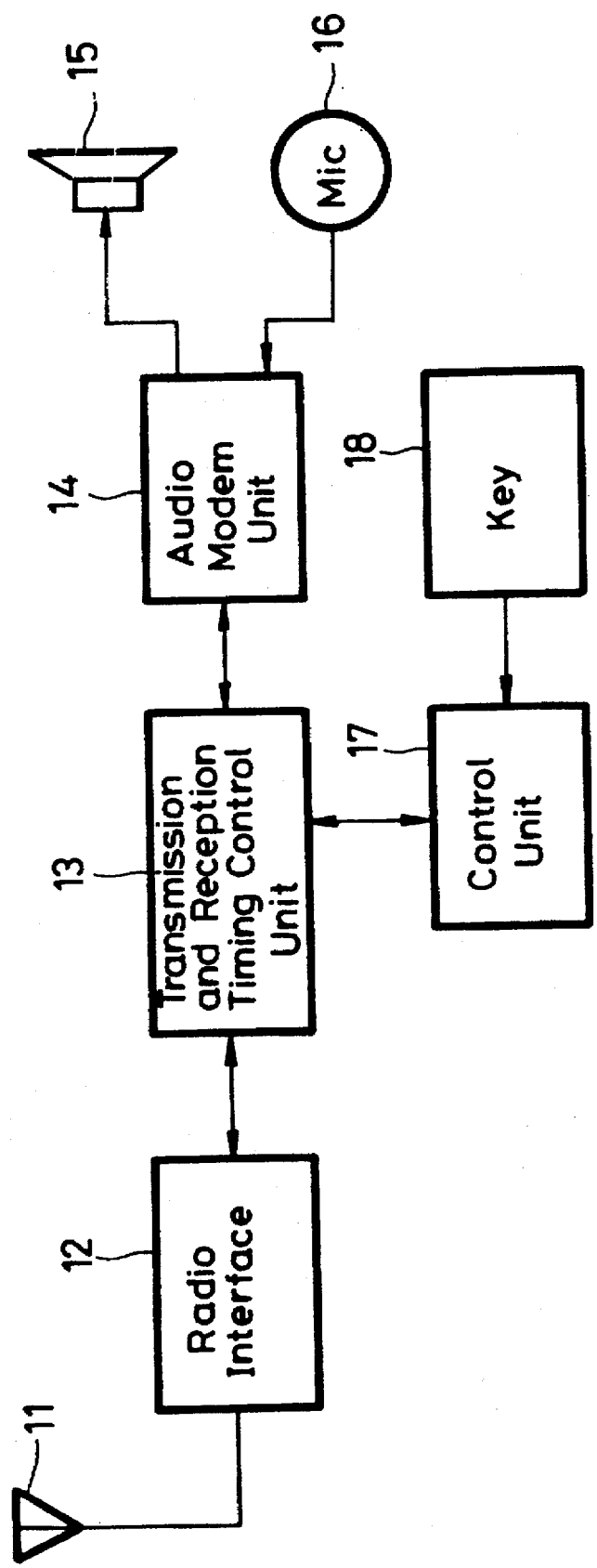
FIG. 3 is a block diagram showing an arrangement of a remote station according to the embodiment of the present invention.

FIG. 3 shows in block form an arrangement of a remote station according to the embodiment of the present invention. As shown in FIG. 3, an antenna 11 is connected to a radio interface 12. The radio interface 12 demodulates or modulates a received signal received at the antenna 11 so that the signal can be transmitted or received satisfactorily upon radio communication. The radio interface 12 is connected to a transmission and reception timing control unit 13. The transmission and reception control unit 13 extracts only a signal of a predetermined slot from a received signal and carries out a necessary processing based on the TDMA system in which a transmission signal is transmitted at a timing of a predetermined slot. The transmission and reception timing control unit 13 controls the timing under the control of a control unit 17 which controls the communication of the remote station. In this case, the control unit 17 carries out a control operation based on control data extracted from the received data by the transmission and reception timing control unit 13, i.e., control data transmitted thereto from the master station. When the transmission and reception timing control unit 13 cannot receive control data, the transmission and reception timing control unit 13 memorizes control data received last and continues carrying out a control operation based on the control data thus stored therein.

The transmission and reception timing control unit 13 is connected to an audio MODEM (modulator and demodulator) unit 14. The audio MODEM unit 14 carries out a demodulation processing wherein digital audio data is extracted from the received data and converted into an analog audio signal and a processing wherein the analog audio signal is converted to digital audio data and transmitted as a transmission signal. A speaker 15 and a microphone (MIC) 16 are connected to the audio MODEM unit 14. The audio signal that has been demodulated by the audio MODEM unit 14 is emanated from the speaker 15 and a sound picked up by the microphone 16 is supplied to the audio MODEM unit 14 as an audio signal.

Therefore, in the inventive remote station, when audio data supplied from the transmission and reception timing control unit 13 to the audio MODEM unit 14 is interrupted temporarily, the audio signal supplied to the speaker 15 is temporarily placed in the mute state until the transmission and reception timing control unit 13 starts supplying audio data to the audio MODEM unit 14.

A key 18 such as a dial key is connected to the control unit 17 which carries out communication control in this remote station. The transmission and reception apparatus can make an outgoing call or receive an incoming call as a telephone set when the key 18 is operated.

A communication state among the inventive master station and the inventive remote stations will be described below with reference to a flowchart of FIG. 4 and communication timing charts shown in FIGS. 5A to 5E and FIGS. 6A to 6E.

Initially, a slot arrangement applied to the communication according to this embodiment will be described below. According to this embodiment, as shown in FIGS. 5A to 5E or FIGS. 6A to 6E, one frame is composed of 8 slots. Fundamentally, 4 slots of the first half of one frame are assigned to transmission slots of the master station and 4 slots of the second half of one frame are assigned to the reception slots of the master station. This frame structure is repeated and one frame has a duration of 5 milliseconds.

As shown in FIGS. 5A through 5E, the first one slot of one frame is assigned to the control slot C wherein the master station transmits control data to the remote stations when predetermined conditions are satisfied, e.g., four remote stations are connected to the master station as will be described later on. Depending on the condition of the network that is in use, as shown in FIGS. 6A to 6E, it is frequently observed that this control slot C becomes a transmission slot V4 wherein control data is transmitted from the master station to the remote stations. When this transmission slot V4 is in use, as shown in FIGS. 5A to 5E and FIGS. 6A to 6E, the first slot of the 4 slots of the second half of one frame is employed as a reception slot V4' corresponding to the transmission slot V4.

Conditions by which the slots are set as described above will be described below. Initially, when there are three remote stations that are connected to the master station (three remote stations will hereinafter be referred to as "remote stations M1, M2, M3"), transmission and reception are carried out among the remote stations M1, M2, M3 shown in FIGS. 5B, 5C, 5D and FIGS. 6B, 6C, 6D by using transmission slots V1, V2, V3 and the reception slots V1', V2', V3' shown in FIGS. 5A and 6A. In that case, the master station transmits control data to the remote stations by using the control slots C of the starting portions of the respective frames to control the communication states of the respective remote stations M1, M2, M3 on the basis of the control data. The above-mentioned operations are the same as those shown in FIGS. 1A through 1D.

According to this embodiment, in the communication state with this frame structure, another remote station M4 can be connected to the master station (i.e., four remote stations M1, M2, M3, M4 in total can be connected to the master station). When the four remote stations M1, M2, M3, M4 are connected to the master station, the control data may be transmitted by using the control slot C or the control slot C may be used as the transmission slot V4 through which control data is transmitted from the master station to the remote station M4. This decision will be described below with reference to the flowchart shown in FIG. 4.

Figure 4:
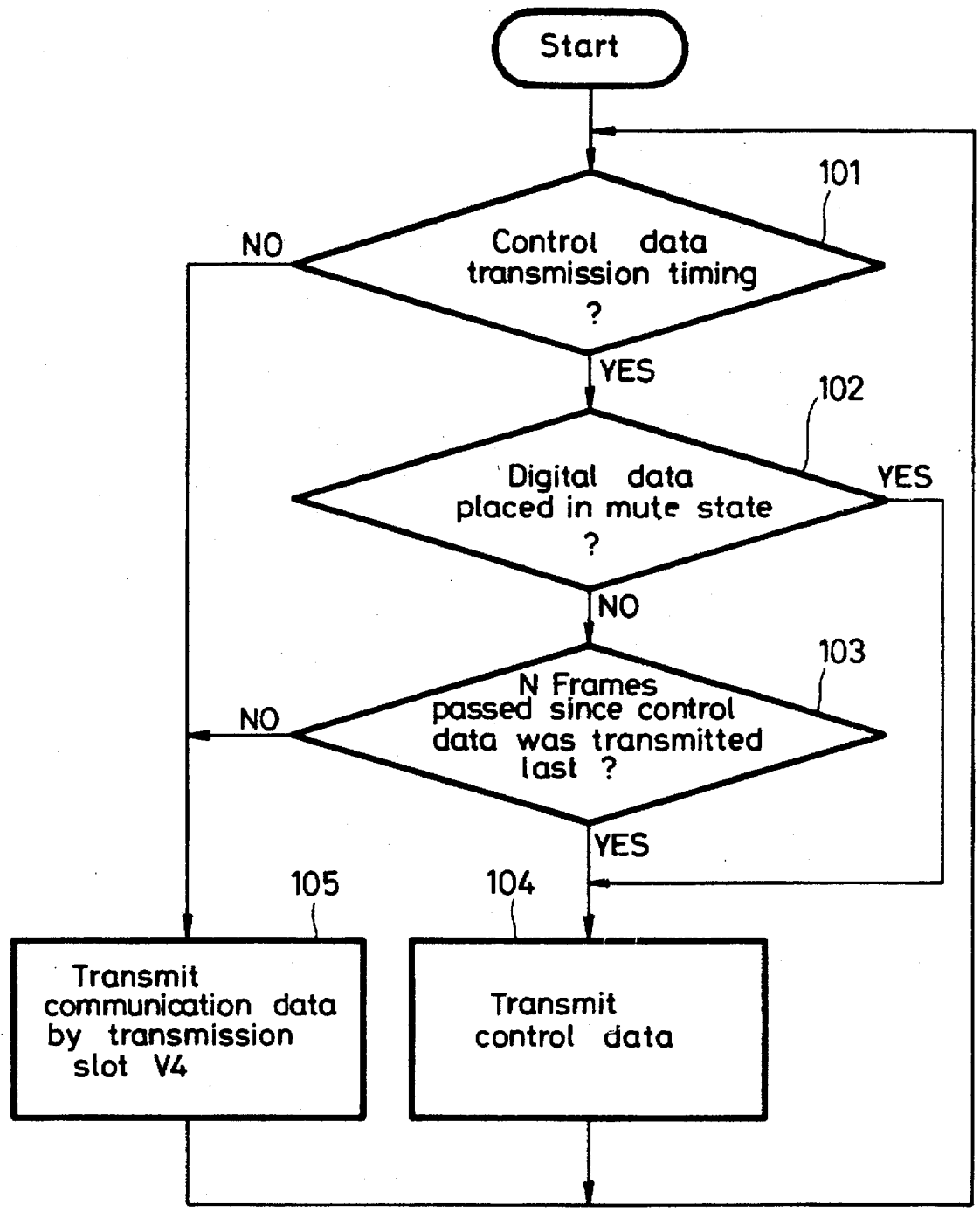
FIG. 4 is a flowchart to which references will be made in explaining the condition of when an inventive slot is in use.

As shown in FIG. 4, following the start of operation, it is determined in decision step 101 whether or not a timing becomes a control data transmission timing. In other words, according to the inventive communication system, since it is sufficient that control data is transmitted once per 20 frames, it is determined in decision step 101 whether or not a timing becomes a transmission timing at which the control slot C is assigned once per 20 frames. If a timing is not the transmission timing of this control slot C as represented by a NO at decision step 101, then the processing proceeds to step 105, whereat the control slot C is used as the transmission slot V4 for the remote station M4 to transmit communication data. Moreover, the remote station M4 shown in FIG. 6E receives communication data by a reception slot R4. At that time, the reception slot V4' corresponding to the transmission slot V4 also is set and a transmission of data from the remote station M4 by using the transmission slot T4 is executed at this timing.

If on the other hand the timing becomes the control data transmission timing as represented by a YES at decision step 101, then the processing proceeds to the next decision step 102. It is determined in decision step 102 whether or not digital data transmitted from the telephone line network side of the network connected last is placed in the mute state. At that time, it is determined on the basis of detected data from the mute detecting unit 7 whether or not the digital data is placed in the mute state. If the digital data is placed in the mute state as represented by a YES at decision step 102, then the processing proceeds to step 104, whereat control data is transmitted as the control slot C. The frame structure provided at that time becomes such one as shown in FIGS. 5A through 5E. The control data used at that time is data that is transmitted to all of the remote stations M1 to M4.

If on the other hand the transmitted digital data is not placed in the mute state as represented by a NO at decision step 102, then the processing proceeds to the next decision step 103. In decision step 103, it is determined whether or not N frames (e.g., 40 frames) are passed since the control data was transmitted last. The N frames have a period corresponding to a limit time wherein the remote stations M1 to M4 can maintain a communication among them and the master station on the basis of the previously-received control data, i.e., the remote stations M1 to M4 can maintain a frame synchronization. Therefore, if control data were not transmitted once at least in the N frames, the remote stations could not communicate with the master station.

If the N frames are passed as represented by a YES at decision step 103, then the processing proceeds to step 104, whereat the control data is transmitted as the control slot C. If on the other hand the N frames are not passed as represented by a NO at decision step 103, then the processing proceeds to step 105, whereat the control slot C is set to the transmission slot V4 of the remote station M4 to transmit communication data.

In any case, a slot provided between the transmission slot V3 and the reception slot V1' of the master station is set to the reception slot V4' from the remote station M4 shown in FIGS. 5E and 6E to receive communication data transmitted by the transmission slot T4 of the remote station M4.

The state shown at the timing $t_N$ shown in FIGS. 5A through 5E shows the state that the control data is transmitted by the control slot C even when the digital data is not placed in the mute state after it was determined in decision step 103 that the timing becomes the timing having the period corresponding to the limit time in which a communication can be maintained at this timing $t_N$.

As described above, according to the inventive frame structure, the master station can communicate with one remote station by using the slot assigned to transmit control data. Thus, it is possible to increase the number of the remote stations that can be connected to the master station by one without varying the frame period and the like. In this case, if the control data is transmitted when the communication data transmitted to the remote station which uses this slot is placed in the mute state, then the control data is transmitted so long as no trouble occurs even though the transmission of data of one slot is failed during communication data is transmitted between the master station and the remote station. Therefore, it is possible to efficiently transmit both the communication data concerning audio data and the control data by using the control slot. Incidentally, since the mute state of communication data appears frequently upon ordinary conversation, there is then the large possibility that control data can be transmitted at the predetermined period.

If the communication data is not placed in the mute state, then when the timing becomes the limit of time whereat the communication can be maintained by the control data transmitted last, control data is forced to be transmitted. Therefore, the communication states among the remote stations can be maintained satisfactorily. In this case, although communication data concerning audio data is interrupted once per N frames during one frame period in the remote station M4 which was connected to the master station last, in the remote station according to this embodiment, an audio signal reproduced at that time is placed in the mute state only during one frame period, i.e., 5 milliseconds. This one frame period is not long enough for the user to identify the mute state in actual practice. Therefore, this one frame period does not hinder the user from hearing communication data substantially.

When control data or communication data is transmitted by one slot, since corresponding identification codes are added to the control data and the communication data, even if the two data of the control data and the communication data are provided in the mixed state like this embodiment, it is possible to easily discriminate the communication data and the control data one from another by the remote station.

While the four remote stations M1 to M4 are connected to the master station by using one transmission channel as described above, when any one of the slots becomes disabled in use after a communication done by the remote station which uses any of the slots V1 and V1', V2 and V2', V3 and V3' was finished, it is preferable that a communication which uses the slots V4, V4' is moved to the disabled slot. If the slot in use is moved as described above, then it is possible to prevent communication data, i.e., a sound output from the speaker 15 from being interrupted temporarily.

The used slot can be moved by transmitting corresponding control data from the master station to the remote station on the basis of the control done by the control unit 6 of the master station.

When control data such as a connection request signal is transmitted from the respective remote stations to the master station by using the same channel, it is sufficient to use the first slot V4' of the second half slots of one frame, for example. In this case, since the connection request signal need not be transmitted when a connection between the remote station and the master station is completed, the master station need not receive control data from the remote station under the condition that the four remote stations are all connected to the master station. Therefore, it is sufficient that the master station receives only communication data from the remote station under the condition that the control slot is used as the slot V4'. Thus, the four remote stations and the master station can communicate with one another satisfactorily.

Further, while one frame is composed of 8 slots to multiplex four telephone networks as described above, the present invention is not limited thereto. It is needless to say that the control slot may be used as a communication slot when one frame is composed of several slots other than 8 slots.

Furthermore, while a transmission signal modulation system between the master station and the remote station and the like have not been described so far in detail, it is needless to say that the present invention can be applied to a variety of communication systems which transmit and receive data of slot arrangement.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A transmission and reception apparatus including a channel divided into a plurality of frames, each of said plurality of frames being subdivided into a plurality of slots, one slot of each of said plurality of frames being assigned as a dual-purpose slot for carrying control data or communication data and the remaining slots of each of said plurality of frames being assigned as communication slots for carrying communication data, wherein control data is transmitted and received together with communication data, said apparatus comprising:

transmitting and receiving means for transmitting data in the form of time-division-multiplexed data and for receiving data transmitted thereto;

control means for controlling an operation of said transmitting and receiving means, said control means controlling said transmitting and receiving means to transmit said communication data in said dual-purpose slot of all subsequent ones of said plurality of frames at a time for transmitting said control data during a predetermined period after said control data is transmitted in said dual-purpose slot of a previously transmitted one of said plurality of frames, said control means controlling said transmitting and receiving means to transmit said control data in said dual-purpose slot when not transmitting said communication data, and said control means controlling said transmitting and receiving means to transmit said communication data in said communication slots in all of said plurality of frames, whereby each of said plurality of frames includes a dual-purpose slot carrying one of control data and communication data; and detecting means for detecting a mute state from an output signal supplied thereto by said transmitting and receiving means, wherein said control means controls said transmitting and receiving means to transmit said control in said dual-purpose slot of all subsequent ones of said plurality of frames while said detecting means detects said mute state.

2. A transmission and reception apparatus according to claim 1, wherein said control means transmits said control data in a dual-purpose slot of one of said plurality of frames within a predetermined period after said control data is last transmitted in a previously transmitted one of said plurality of frames.

3. A transmission and reception apparatus according to claim 1, wherein said control means transmits said control data in a dual-purpose slot of one of said plurality of frames after a predetermined time has elapsed from when said control data is last transmitted in a previously transmitted one of said plurality of frames.

4. A transmission and reception apparatus according to claim 3, wherein said control means mutes an output audio signal when said control means detects that audio data supplied thereto from said transmitting and receiving means has been interrupted.

5. A transmission and reception apparatus including a channel divided into a plurality of frames, each of said frames being subdivided into a plurality of slots, one slot of each of said plurality of frames being assigned as a dual-purpose slot for carrying control data or communication data and the remaining slots of each of said plurality of frames being assigned as communication slots for carrying communication data, wherein control data is transmitted and received together with communication data, said apparatus comprising:

transmitting and receiving means for transmitting data in the form of time-division-multiplexed data and for receiving data transmitted thereto;

control means for controlling an operation of said transmitting and receiving means, said control means controlling said transmitting and receiving means to transmit said control data in said dual-purpose slot of first predetermined ones of said plurality of frames during a first predetermined period and said control means controlling said transmitting and receiving means to transmit said communication data in said dual-purpose slot of second predetermined ones of said plurality of frames during a second predetermined period, whereby the first predetermined ones of the plurality of frames and the second predetermined ones of the plurality of frames include all of the plurality of frames; and detecting means for detecting a mute state from an output signal supplied thereto by said transmitting and receiving means, wherein said control means controls said transmitting and receiving means to transmit said control data in said dual-purpose slot of all subsequent ones of said plurality frames while said detecting means detects said mute state.

6. A transmission and reception apparatus according to claim 5, wherein said control means transmits said control data in a dual-purpose slot of one of said plurality of frames within a predetermined period after said control data is last transmitted in a previously transmitted one of said plurality of frames.

7. A transmission and reception apparatus according to claim 6, wherein said control means mutes an output audio signal when said control means detects that audio data supplied thereto from said transmitting and receiving means has been interrupted.

8. A communication system comprising:

a master station connected to a telephone line network; and a plurality of remote stations for transmitting and receiving digital data to and from said master station through a radio transmission line, wherein a communication channel between said master station and said remote stations is divided into a plurality of frames, each of said plurality of frames being subdivided into a plurality of slots, one slot of each of said plurality of frames is assigned as a dual-purpose slot carrying control data or communication data and the remaining slots of each of said plurality of frames being assigned as communication slots for carrying communication data, said master station transmits control data to said remote stations in said dual-purpose slot of each of first predetermined ones of said plurality of frames during a first predetermined period, said master station transmits communication data in said dual-purpose slot of each of second predetermined ones of said plurality of frames during a second predetermined period, whereby the first predetermined ones of the plurality of frames and the second predetermined ones of the plurality of frames include all of the plurality of frames; and detecting means for detecting a mute state from an output signal of one of said plurality of remote stations, wherein said master station transmits said control data in said dual-purpose slot of all subsequent ones of said plurality of frames while said detecting means detects said mute state.

9. A communication system according to claim 8, wherein a remote station communicates with said master station based on a most recently received control data when said remote station does not receive control data subsequent to said most recently received control data from said master station.

10. A communication system according to claim 9, wherein said master station transmits said control data in a dual-purpose slot of one of said plurality of frames after a predetermined period has elapsed from when said control data was last transmitted in a previously transmitted one of said plurality of frames.

11. A communication system according to claim 10, wherein said remote station mutes an output of said master station during a predetermined period when said remote station detects that audio data supplied from said master station has been interrupted.

* * * * *